(12) United States Patent
Sato et al.

(10) Patent No.: US 6,906,769 B2
(45) Date of Patent: Jun. 14, 2005

(54) LIQUID CRYSTAL SCREEN DISPLAY

(75) Inventors: Ichiro Sato, Kyoto (JP); Katsuhiko Kumagawa, Osaka (JP); Kazuo Inoue, Osaka (JP); Kazuhiro Nishiyama, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 103 days.

(21) Appl. No.: 10/130,109

(22) PCT Filed: Aug. 30, 2001

(86) PCT No.: PCT/JP01/07473

§ 371 (c)(1),
(2), (4) Date: May 15, 2002

(87) PCT Pub. No.: WO02/19021

PCT Pub. Date: Mar. 7, 2002

(65) Prior Publication Data

US 2003/0081164 A1 May 1, 2003

(30) Foreign Application Priority Data

Aug. 30, 2000 (JP) ........................................ 2000-261675
Sep. 4, 2000 (JP) ........................................ 2000-267770

(51) Int. Cl.[7] ........................ G02F 1/1343; G02F 1/136
(52) U.S. Cl. .......................................... 349/139; 349/42
(58) Field of Search ............................... 349/139, 141, 349/143, 41–43

(56) References Cited

FOREIGN PATENT DOCUMENTS

| JP | 3-137619 | 6/1991 |
|---|---|---|
| JP | 4-320211 | 11/1992 |
| JP | 4-359222 | 12/1992 |
| JP | 04-359222 | 12/1992 |
| JP | 5-88212 | 4/1993 |
| JP | 9-80383 | 3/1997 |
| JP | 9-236822 | 9/1997 |
| JP | 10-90708 | 4/1998 |
| JP | 10-123526 | 5/1998 |
| JP | 10-186391 | 7/1998 |
| JP | 10-206857 | 8/1998 |
| JP | 10-301141 | 11/1998 |
| JP | 11-174491 | 7/1999 |
| JP | 11-344727 | 12/1999 |
| JP | 2001-330841 | 11/2001 |
| JP | 2002-14374 | 1/2002 |

*Primary Examiner*—Dung Nguyen
(74) *Attorney, Agent, or Firm*—McDermott Will & Emery LLP

(57) ABSTRACT

A liquid crystal screen display is disclosed which is capable of restraining occurrence of display unevenness. In the display of the invention, a conductive member to which a negative voltage is applied is placed between a substrate and an alignment layer so as to be in partial contact with the alignment layer. Uneven ion distribution attributable to ion generation within broken or pin hole parts of an overcoat film is restrained, for instance, by exposing gate signal lines etc. to the alignment layer so that ions are intentionally generated in the regions of the liquid crystal layer corresponding to the exposed regions.

20 Claims, 18 Drawing Sheets

(K-K')

(L-L')

(M-M')

LIQUID CRYSTAL SCREEN DISPLAY

TECHNICAL FIELD

The present invention relates to a liquid crystal screen display and more particularly to an improved method for restraining occurrence of display unevenness in active matrix liquid crystal screen displays.

BACKGROUND ART

Liquid crystal screen displays possess advantages such as thinness, light weight, and applicability to low-voltage driving, and therefore, they have been used in many display applications including wrist watches, desk-top calculators, personal computers and word processors as well as in light shutter applications.

The most popular liquid crystal screen displays are the Twisted Nematic (TN) mode liquid crystal screen displays in which a liquid crystal layer is held between a pair of substrates and electrodes are placed on the respective substrates, for establishing an electric field for driving liquid crystal molecules in the liquid crystal layer. The TN mode liquid crystal screen displays do not have a sufficiently wide angle of view. Up to now, there have been proposed various driving mode liquid crystal screen displays having wider angles of view than the TN mode liquid crystal screen displays, these displays including the IPS (In-Plane Switching) mode in which a pair of electrodes for driving liquid crystal molecules are placed within the same pixel on the same substrate; the PVA (Patterned Vertical Alignment) mode in which a pair of substrates are alternately provided with a substantially linear electrode within the same pixel; the OCB mode (Optically Compensated Birefringence) mode which has an electrode layout similar to that of the TN mode but provides wider angles of view; and the MVA (Multi-domain Vertical Alignment) mode.

FIG. 17 shows one example of array substrates for use in the IPS mode liquid crystal screen displays. FIGS. 18a, 18b and 18c show sectional views of a liquid crystal screen display that uses the substrate shown in FIG. 17. In a pixel region defined by a pair of gate signal lines 4 and a pair of source signal lines 5 on an array substrate 2, pixel electrodes 6 and common electrodes 7 are both laid out in a comb-like fashion and placed with an insulating layer 11 between. The common electrodes 7 within one pixel region are electrically connected to those of the adjacent right and left pixel regions (in the drawing) by a common electrode line 8 integrally formed therewith. The source signal lines 5 formed on the same layer as the pixel electrodes 6 are connected to the pixel electrodes 6 through a thin film transistor (TFT) 9. The gate signal lines 4 are formed on the same layer as the common electrodes 7 and others to supply the TFT 9 with a signal for controlling the electrical connection between the source signal lines 5 and the pixel electrodes 6. In the region where the pixel electrodes 6 and the common electrode line 8 are overlapped, a storage capacitor 23 is formed.

An overcoat film (passivation film) 12 is laid over the surface of the array substrate 2 having these signal lines and electrodes formed thereon, and an alignment layer 16 is further formed so as to cover the overcoat film 12.

A liquid crystal screen display 1 comprises the array substrate 2 shown in FIG. 17 and an opposed substrate 3 which faces the array substrate 2 across a liquid crystal layer 18. On the surface of the opposed substrate 3 facing the array substrate 2, a lattice-like black matrix 14 for defining the pixel regions and a color filter 15 having sections corresponding to the pixel regions are formed and the alignment layer 16 is formed so as to cover them. Since the region immediately above the common electrode line 8 does not contribute to normal displaying by the pixels, a black matrix is sometimes used, in place of the color filter, in the region where the opposed substrate 3 faces the common electrode line 8.

In the formation of electrodes and signal lines on a substrate for liquid crystal screen displays, these elements are liable to electrical short owing to contamination with dust particles or pattern defects of the electrodes. Above all, array substrates for IPS mode liquid crystal screen displays are most likely to cause electrical short in their formation process because of the provision of comb-like pixel electrodes and common electrodes.

If the short-circuited portions are isolated by laser irradiation, the portions of the overcoat film which have been irradiated with the laser beams tend to be destroyed so that the signal lines and others reveal from the overcoat film. If the gate signal lines are exposed resulting from the laser irradiation, display unevenness is likely to occur in the regions repaired by the laser irradiation, when the liquid crystal screen display having such a substrate is continuously driven. In the case of a normally black display panel for instance, images displayed by the pixels in repaired regions are darker than those displayed by the surrounding pixels.

In fact, an IPS mode liquid crystal screen display was fabricated by use of an array substrate in which an overcoat film in the regions provided with gate signal lines had been removed by laser irradiation and was continuously driven at a temperature of 50° C. for twelve hours in a thermostatic oven. When images of intermediate gray scale are displayed by this display, display unevenness was observed in the regions which had been subjected to laser irradiation. This display unevenness is conceivably attributable to the fact that the voltage retention of the liquid crystal layer in the laser-irradiated regions locally decreases owing to local ion generation in the regions of the liquid crystal layer surrounding the laser-irradiated regions or to impurity ions which have been included in the liquid crystal layer beforehand and adsorbed in the laser-irradiated regions. In the regions where the overcoat film is destroyed, the signal lines having a specified potential are exposed. Therefore, electrons are introduced into the liquid crystal layer from the signal lines or the like and liquid crystal molecules are decomposed or electrically charged, resulting in ion generation or ion adsorption in the regions. The local uneven distribution of ions causes a drop in the voltage retention of the liquid crystal layer of these regions and, in consequence, display unevenness. Since the so-called reverse driving for alternately reversing the polarities of the pixel electrodes relative to the common electrodes is generally adopted, exposed elements generate ions in a certain period and retrieve ions in another period. Accordingly, there arises no serious problems even if the overcoat film in the regions where the pixel electrodes, the common electrodes and the source signal line are formed is destroyed. In contrast with this, if the overcoat film is destroyed in the regions where gate signal lines are formed whose polarity is negative with respect to the pixel electrodes and the common electrodes, negative ions are substantially constantly generated or positive ions are adsorbed in these regions. Therefore, ion concentration becomes extremely high in these regions, compared to other regions. Similar display unevenness occurs, for example, in cases where pin holes are created in the overcoat film laid over the gate signal lines or where the gate signal lines have level differences.

To restrict the influence of pinholes, Japanese Patent Publication (KOKAI) No. 10-206857, for example, proposes that the overcoat film be 0.4 µm or more thicker than the electrodes in contact with the overcoat film. According to this publication, although the exposure of the electrodes to the liquid crystal layer through pin holes can be reduced by use of an overcoat film having sufficient thickness, it has no effect of restraining the exposure of signal lines and others due to the destruction of the overcoat film by laser irradiation.

Japanese Patent Publication (KOKAI) No. 10-186391 has proposed that part of the electrodes be formed in contact with an alignment layer and the resistivity of the liquid crystal material be $10^{13}\Omega$ or more in order to restrain display abnormalities due to d.c. components remaining in the overcoat film (i.e., insulating film) of an IPS mode liquid crystal screen display. By exposing the pixel electrodes, ions in the liquid crystal layer can be retrieved on the exposed surface. However, since the voltage of the pixel electrodes is retained only by the storage capacitor during most of the period of time when the panel is driven, active retrieval of ions results in a drop in interelectrode voltage. More concretely, the ion concentration of the liquid crystal layer cannot be effectively reduced. Selection of a liquid crystal material based on resistivity is not necessarily appropriate in view of prevention of image persistence and high-speed response.

In such a situation, there have been demands toward liquid crystal screen displays capable of effectively restraining occurrence of display unevenness attributable to ions which have been locally generated within the liquid crystal layer.

DISCLOSURE OF THE INVENTION

A primary object of the invention is to provide a liquid crystal screen display capable of restraining display unevenness attributable to ions which have been locally generated within the liquid crystal layer and displaying satisfactory images for a long time.

According to the present invention, there is provided a liquid crystal screen display comprising: a first insulating substrate; a second insulating substrate facing the first insulating substrate; a liquid crystal layer formed between the first and second insulating substrates; alignment layers formed between the first insulating substrate and the liquid crystal layer and between the second insulating substrate and the liquid crystal layer, respectively, for aligning the liquid crystal layer; and a first conductive member which is formed between at least either one of the first and second insulating substrates and its corresponding alignment layer, being in partial contact with the alignment layer and to which a negative voltage is applied, the liquid crystal screen display further comprising another conductive member which is formed between at least either one of the first and second insulating substrates and its corresponding alignment layer, being in partial contact with the alignment layer, and to which a negative voltage is applied.

An overcoat film is provided with apertures in the regions, where a conductive member having a stable polarity that is substantially positive or negative with respect to the pixel electrodes and the common electrodes is placed, such that part of the conductive member is in contact with the liquid crystal layer or faces the liquid crystal layer across only an alignment layer. The conductive member generates ions in the regions where the apertures are formed, like ion generation in laser irradiated regions and pin hole regions.

Specifically, the conductive member, examples of which include signal lines and electrodes, is made to be in contact with the liquid crystal layer or opposed to the liquid crystal layer through only the alignment layer, thereby intentionally forming regions where ions are generated. The display unevenness of the liquid crystal screen displays described earlier is caused by formation of local regions within the liquid crystal layer, the regions having ion concentrations different from that of other regions. It means that if the ion concentration of the liquid crystal layer is uniform irrespective of its degree, display unevenness will not occur.

For effective ion generation in the liquid crystal layer, it is desirable to use gate signal lines as the above conductive member. The gate signal is in its ON state only for a period of one horizontal scan during the flame scan period and in its OFF state in other periods. Accordingly, the polarity of the gate signal lines relative to the pixel electrodes and the counter electrodes is negative for most of the flame scan period. Ion generation is likely to occur mainly in negative electrodes and particularly in the gate signal lines. The potential of the counter electrodes is constant or has insignificant fluctuations so that it does not contribute to ion generation. Generally, the polarity of the source signal lines is alternately reversed relative to the counter electrodes, so that the source signal lines generate ions and retrieve them. The conductive member may be a third electrode that is driven independently of the pixel electrodes and the common electrodes. It, however, should be noted that the conductive member may be other signal lines and electrodes, depending on the form of drive signals.

Preferably, the percentage of area of the conductive material exposed to the alignment layer ranges from 10% to 50% in order to attain uniform ion concentration for the liquid crystal layer and to avoid an excessive removal of the overcoat film 12.

Occurrence of electrical short can be more effectively restrained by forming an insulating film on the surfaces of the gate signal lines by anodic oxidation in the regions where the gate signal lines intersect other signal lines. For instance, the regions above which an aperture is to be formed and the regions (e.g., connector terminals) where the conductivity of the surfaces of signal lines needs to be ensured are masked while an anodic oxidation film being selectively formed in other regions. As the material of the gate signal lines, aluminum, tantalum, zirconium and alloys containing these metals in an amount of 80 wt % or more are suitably used in the light of easy anodic oxidation and the stability of an oxide film to be formed.

As the ion concentration of the liquid crystal layer increases, the resistivity of the liquid crystal layer decreases, causing fluctuations in the substantial driving voltage applied to the liquid crystal layer. It is therefore preferable to further provide a conductive member for retrieval of ions from the liquid crystal layer in order to maintain the ion concentration of the liquid crystal layer at a low level.

Like the conductive member for ion generation, the conductive member for ion retrieval is placed such that at least part of it is in contact with the liquid crystal layer or disposed adjacent the liquid crystal layer with the alignment layer between, and has specified potential. The conductive member has a polarity that is positive with respect to the gate signal lines. For example, the pixel electrodes or common electrodes may be used as the conductive member. Although great effects cannot be expected by using these electrodes for ion retrieval in a liquid crystal screen display having no ion generation means, the ion concentration of the liquid crystal layer can be maintained within a specified range by retrieving ions with the conductive member while generating ions. Examples of the conductive member further include other signal lines and the third electrode.

In general, the pixel electrodes and the common electrodes are formed on different layers with an insulating layer between. For exposing the electrodes on the lower layer to the alignment layer or to the liquid crystal layer, such a process is taken that electrode components on the same layer as the upper electrodes or on the further upper layer are added to the electrodes on the lower layer and then, an aperture is formed in the overcoat film laid over the electrode components thus added.

When forming the lower electrodes and the gate signal lines at the same time, a sufficient margin can be obtained between the gate signal lines and the electrodes formed on the same layer as the gate signal lines by providing electrode components for a region adjacent the gate signal lines. In this way, occurrence of electrical short at the time of formation of these elements can be restrained. Electrode components are positioned in the vicinity of the gate signal lines but formed on a layer different from the layer on which the gate signal lines are formed, with an insulating layer being interposed between these layers.

In addition, the signal lines or the electrodes on the upper layer can be easily exposed by providing an overcoat film for only the region including a switching element while no overcoat film is laid over the electrodes and the signal lines.

A substance having ion retrievablility is placed so as to be in contact with the liquid crystal layer or the alignment layer. Examples of such a substance include adsorptive substances such as aluminum oxide; physical adsorptive substances such as porous glass and porous silicon that adsorb ions; and chemical adsorptive substances such as ion exchange resin.

The size of the apertures formed in the overcoat film for ion generation and ion retrieval affects the ion generation capability and ion retrievablility of the apertures. For obtaining a means having satisfactory ion generation capability and ion retrievablility, the diameter or side length of the apertures is preferably 5 $\mu$m or more. To restrain the influence of the apertures upon display quality, the diameter or side length of the apertures should be no more than 100 $\mu$m which is difficult to be seen by the naked eye.

To avoid the influence of the panel upon display quality, the third electrode serving as the conductive member for ion generation or ion retrieval is preferably placed on the black matrix of the opposed substrate or in the region opposed to the common electrode line. These regions are not associated with normal displaying by the pixels in a plan view of the display device.

Provision of a conductive member for ion generation for every pixel most effectively restrains occurrence of display unevenness. It is apparent that a conductive member may be provided for every specified number of pixels. The distribution of the conductive members is determined taking into consideration their ion generation capability as well as the influence of their arrangement upon the display quality of the panel. The distribution of the conductive members for ion retrieval is also determined by taking account of their ion retrievablility and the influence of their arrangement upon the display quality of the panel. Since the visibility of humans to luminance variations in blue is lower than to luminance variations in other colors (i.e., red and green), provision of the conductive members for blue pixels reduces a feeling of physical disorder given to human beings, compared to the case where other color pixels are provided with the conductive members.

In another liquid crystal screen display of the invention, electrolytic salt is added for forming ions within the liquid crystal layer. Where electrolytic salt is added to the liquid crystal layer beforehand, even if ions are locally generated, the difference in ion concentration between regions and, in consequence, display unevenness occurring in the panel are reduced.

One preferable example of the electrolytic salt is a chemical compound represented by the chemical formula: $(t-Bu)_4NX$. Preferably, X is halogen or COOR (herein, R is hydrogen, a hydro carbon group or alkali metal).

The invention is applicable to all the driving modes of liquid crystal displays. It is particularly useful for the IPS mode and PVA mode liquid crystal screen displays which require elaborate processing for the formation of the electrodes and others.

BEST MODE FOR CARRYING OUT THE INVENTION

With reference to the accompanying drawings, preferred embodiments of the present invention will be hereinafter described in details, taking IPS mode liquid crystal screen displays for example.

First Embodiment

Figure 1:
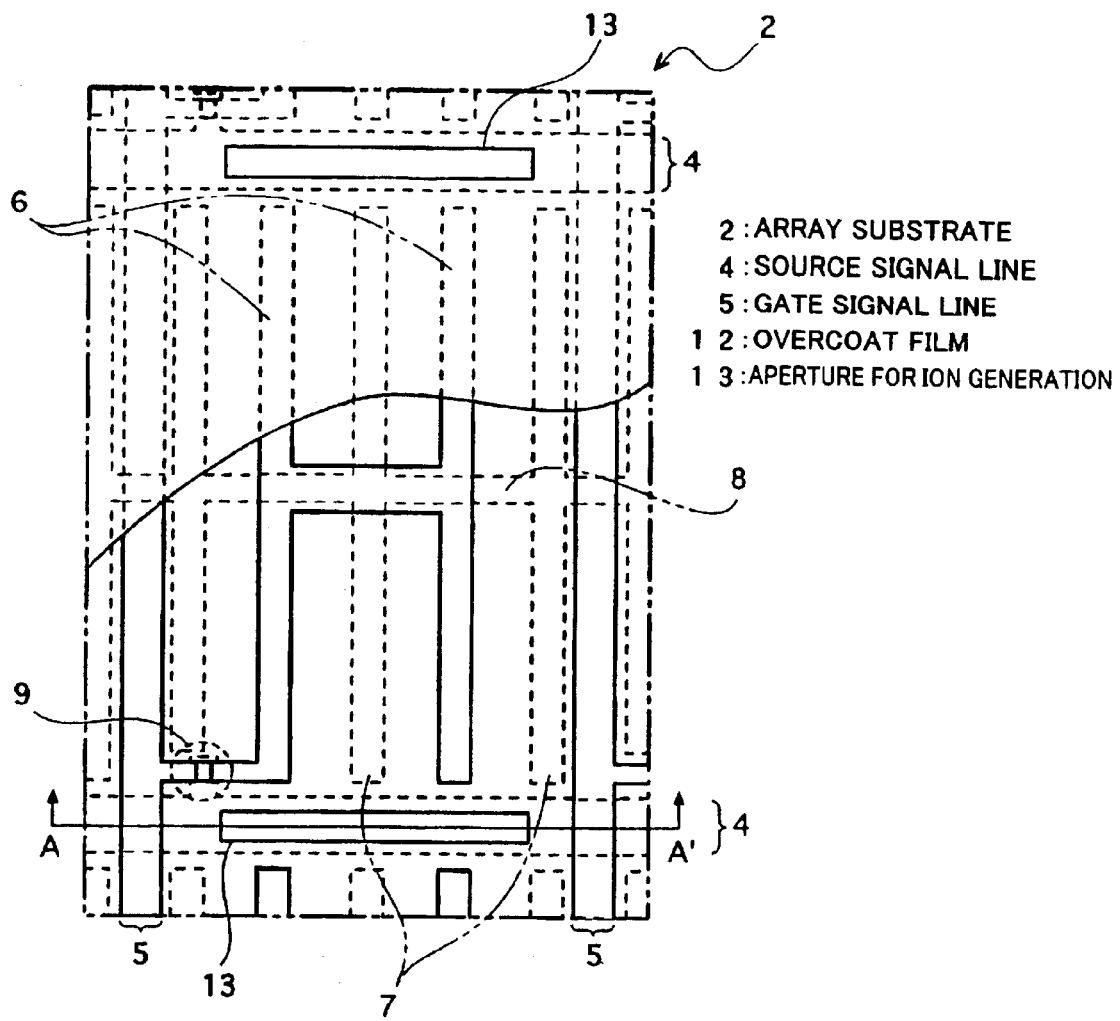
FIG. 1 is a partially cut-away plan view showing an essential part of an array substrate for use in a liquid crystal screen display according to one embodiment of the present invention.
Figure 2:
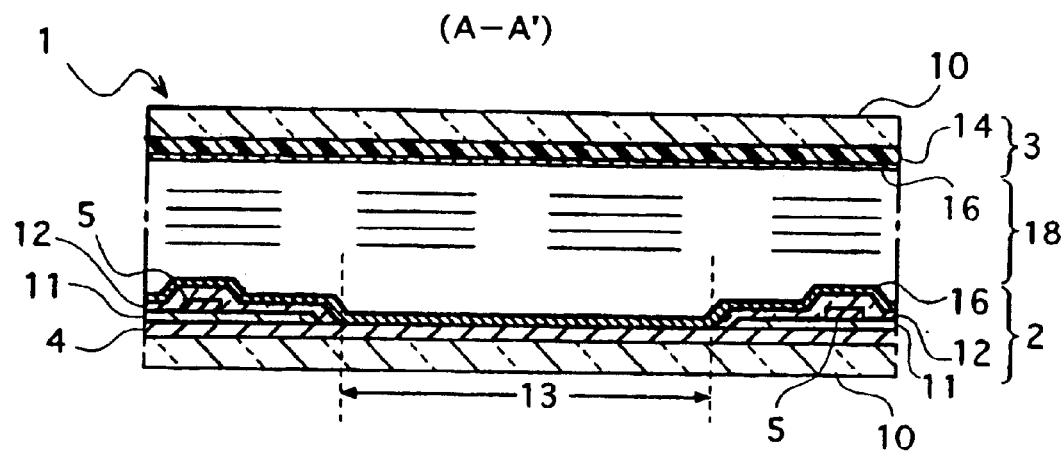
FIG. 2 is a longitudinal sectional view showing the essential part of the liquid crystal screen display.

FIG. 1 shows an array substrate for use in a liquid crystal screen display of the first embodiment. The liquid crystal screen display employing this array substrate is shown in FIG. 2.

Figure 17:
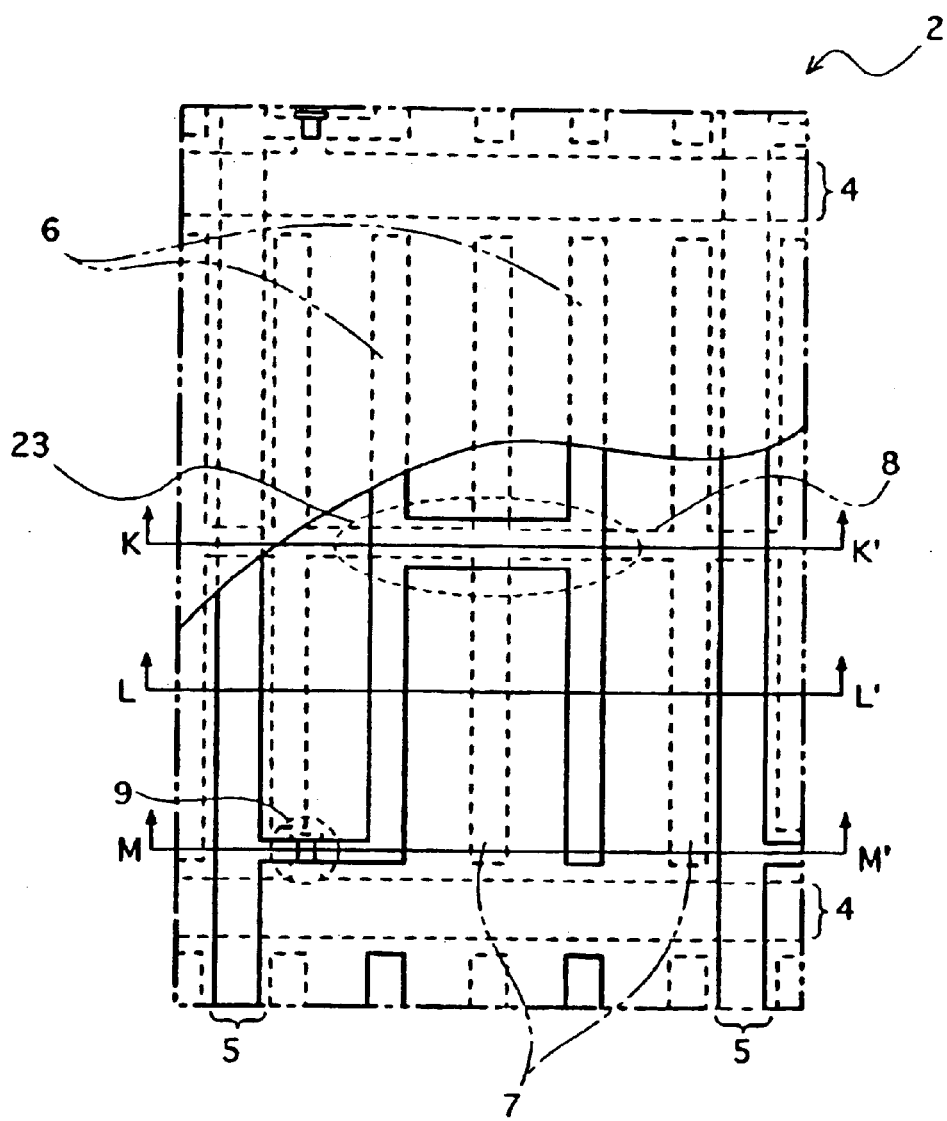
FIG. 17 is a partially cut-away plan view showing an essential part of an array substrate for use in a conventional liquid crystal screen display.
Figure 18A:
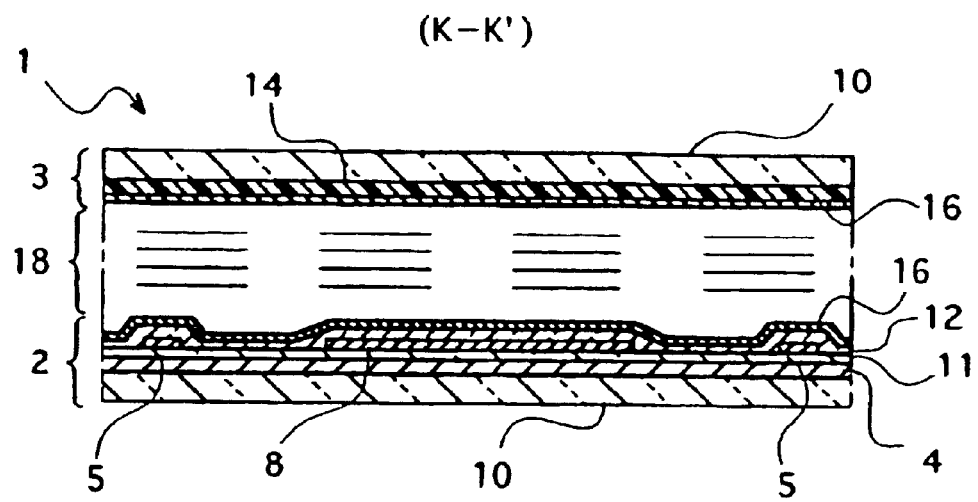
FIG. 18a is a sectional view taken along line K–K' of FIG. 17.
Figure 18B:
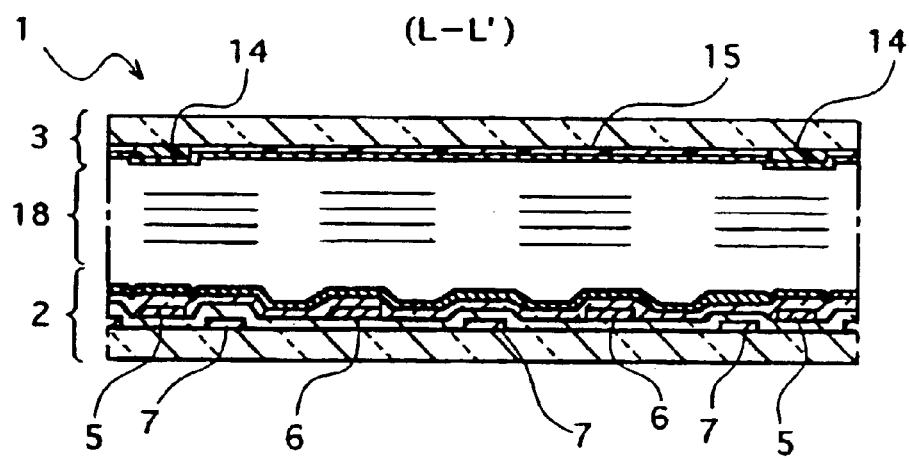
FIG. 18b is a sectional view taken along line L–L' of FIG. 17.
Figure 18C:
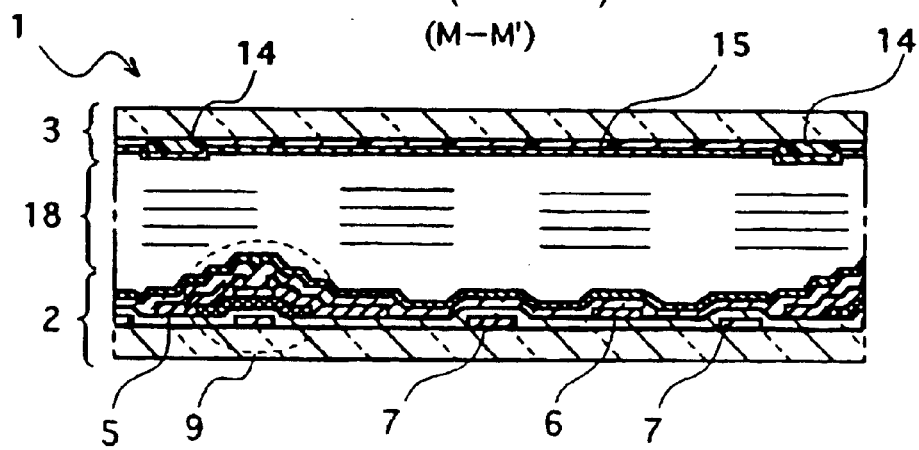
FIG. 18c is a sectional view taken along line M–M' of FIG. 17.

The array substrate 2 has electrodes and signal lines in a similar layout to that of the array substrate of the prior art shown in FIG. 17. In a pixel region enclosed by a pair of gate signal lines 4 and a pair of source signal lines 5, pixel electrodes 6 and common electrodes 7, which are both comb-like in shape, are placed with an insulating layer 11 between. The common electrodes 7 in one pixel region are electrically connected to common electrodes 7 within the right and left adjacent pixel regions shown in FIG. 1 through a common electrode line 8 that is integrally formed with the common electrodes 7. The source signal lines 5 formed on the same layer as the pixel electrodes 6 are connected to the pixel electrodes 6 through a thin film transistor (TFT) 9. The gate signal lines 4 are formed on the same layer as the common electrodes 7 and others, for supplying a signal to the TFT 9 to control the electrical connection between the source signal lines 5 and the pixel electrodes 6.

An overcoat film 12 is laid over the surface of the array substrate 2 on which these signal lines and electrodes are formed. An alignment layer 16 is formed so as to cover the overcoat film 12.

A black matrix 14 of a lattice shape for defining pixel regions and a color filter (not shown) having sections corresponding to the respective pixel regions are formed on the surface of an opposed substrate 3 that faces the array substrate 2 across a liquid crystal layer 18. Another alignment layer 16 is further disposed so as to cover them.

The array substrate 2 has overcoat film apertures 13 on the overcoat film 12 immediately above the gate signal lines 4, as shown in FIGS. 1 and 2. In the region where each aperture 13 is formed, a gate signal line 4 is in contact with an alignment layer 16 as shown in FIG. 2. The gate signal lines 4 in the regions where they are exposed to this alignment layer generate ions within the liquid crystal layer 18 when the panel is in service.

The array substrate 2 is fabricated, for example, in the following way.

A conductive film is formed from aluminum etc. on the surface of the glass substrate 10, and then, this conductive film is processed to form the gate signal lines 4, the common electrodes 7, and the common electrode line 8. Regarding the size of the apertures 13, the area of each aperture 13 in a plan view accounts for 10% to 50% of each gate signal line 4. If the area of the aperture 13 is less than 10%, the size of the aperture 13 is not sufficient to attain uniform ion concentration in the liquid crystal layer without difficulty. If the area of the aperture 13 exceeds 50% on the other hands, the amount of removal of the overcoat film 12 will increase excessively. It is preferable that the area accounting for 15% to 40% of each gate signal line 4 be opened by each aperture 13.

Then, an insulating film is formed from silicon oxide or the like so as to cover them and a semiconductor layer for the TFT 9 having a specified shape is further formed on the insulating film. The insulating film formed herein also serves as a gate insulating film for the TFT 9. After filling a specified region of the semiconductor layer thus formed with impurities, an insulating layer is similarly formed from silicon oxide etc. so as to cover them. The two layers of insulating films constitute the insulating film 11.

After the formation of the insulating film 11, a contact hole is formed at a specified position within the region where the semiconductor layer of the substrate 10 is formed. An aluminum film and a titanium film are formed to cover the entire surface of the substrate 10 and this multiple layered film is processed to form the source signal lines 5 integral with the source electrode of the TFT 9 and the pixel electrodes 6 integral with the drain electrode of the TFT 9.

In this way, the overcoat film 12, which is made from silicon nitride or the like and covers the surface of the substrate 10 having the signal lines and the electrodes thereon, is formed, and the apertures 13 are formed by selectively removing the overcoat film 12 at specified positions within the regions where the gate signal lines 4 are formed. At the same time, the overcoat film 12 formed on the peripheral edge of the substrate 10 is removed as necessary, to expose a connector terminal (not shown) that is placed for connection between the signal lines formed there and an external driving circuit. Thereafter, the alignment layer 16 made from polyimide or the like is formed on the surface of the substrate 10 in a specified manner and the array substrate having the apertures 13 (such as shown in FIG. 1) at which part of the respective gate signal lines 4 is in contact with the alignment layer 16 is obtained.

Where the gate signal lines 4 are exposed by removing the overcoat film and the alignment layer with a laser such as described in Background Art, electrons also move from the gate signal lines 4 to the liquid crystal layer 18 so that liquid crystal molecules are ionized. However, the ionized liquid crystal molecules, in this case, are likely to be accumulated at the exposed portions of the gate signal lines 4, because the exposed portions of the gate signal lines 4 are small. The accumulation of the ionized liquid crystal molecules at the exposed portions of the gate signal lines 4 causes variations in ion concentration, which can be the cause of display unevenness. In the case of the present embodiment, electrons move from the gate signal lines 4 to the liquid crystal layer 18 through an extremely thin alignment layer 16, the gate signal lines 4 being supplied with a negative voltage at all times except when the TFT 9 is in its ON state. Therefore, liquid crystal molecules are ionized (i.e., an anionization) and the ionized liquid crystal molecules extensively disperse throughout the liquid crystal layer 18 so that the ion concentration of the liquid crystal layer 18 becomes uniform as a whole (i.e., variations in ion concentration are eliminated). This is thought to be the reason why display unevenness does not occur in the present embodiment.

In some cases, excessively high ion concentration resulting from an excessive number of liquid crystal molecules which have been ionized within the liquid crystal layer 18 causes troubles in displaying. It is conceivable that, in the present embodiment, ionized liquid crystal molecules extensively disperse within the liquid crystal layer 18 so that the ion concentration of the liquid crystal layer 18 does not increase, on the whole, to the extent that troubles are caused in displaying.

Figure 3:
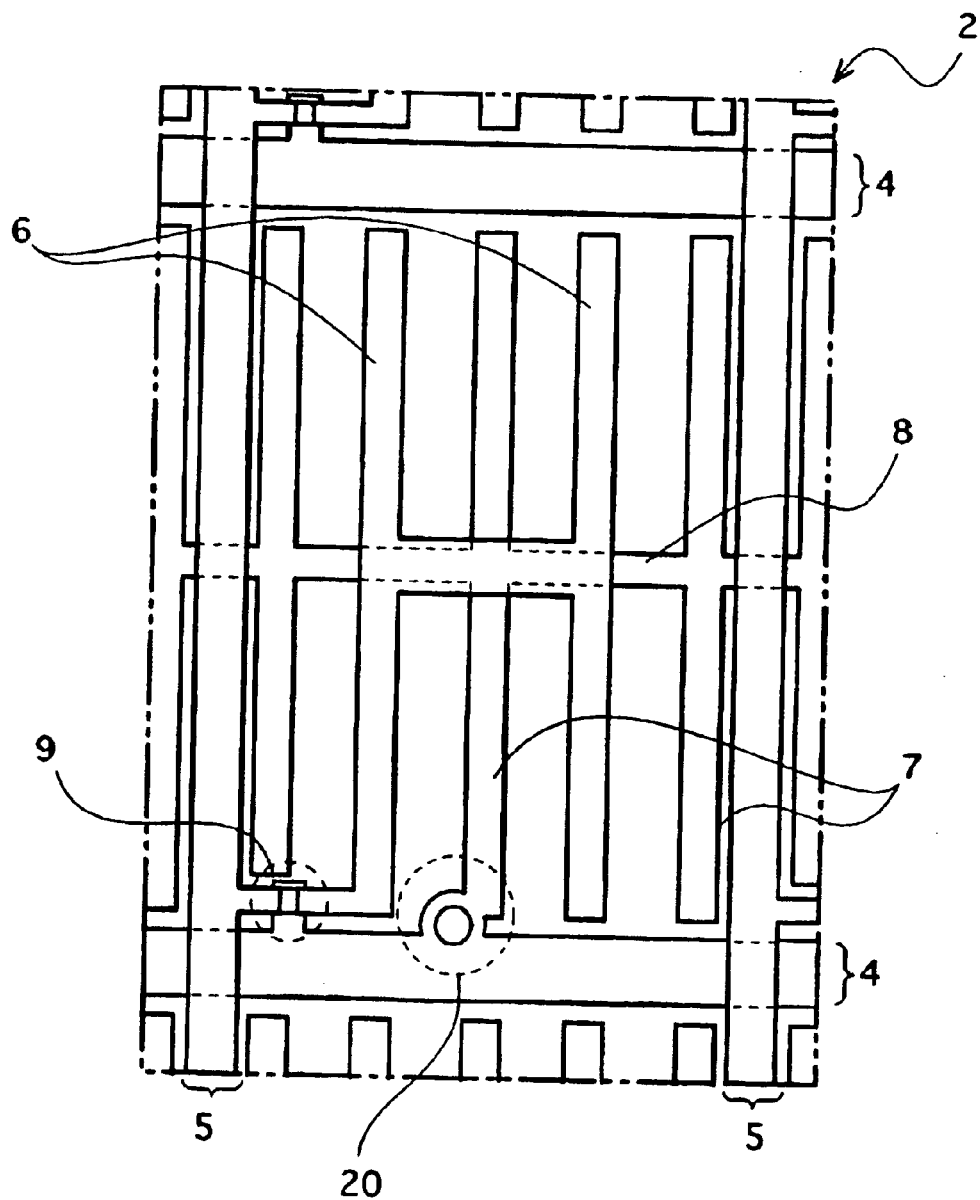
FIG. 3 is a plan view showing an essential part of an array substrate having a pattern abnormality, the substrate being prepared for evaluation in the above embodiment.

A test was actually conducted in which after a pattern abnormality portion 20 was intensively formed between a gate signal line 4 and a pixel electrode 6 as shown in FIG. 3, an overcoat film 12 was formed so as to cover them. The abnormality portion 20 was then irradiated with a laser beam thereby separating the gate signal line 4 and the pixel electrode 6 from each other. Subsequently, apertures 13 were formed in the overcoat film as shown in FIGS. 1 and 2, and an alignment layer 16 was further formed to obtain an array substrate 2. A liquid crystal screen display was fabricated, using this array substrate.

After the liquid crystal screen display of the present embodiment thus fabricated was continuously driven at 50° C. for 300 hours, it displayed good intermediate gray scale images free from unevenness. In this experiment, the voltages applied to the source signal lines 5 and applied to the gate signal lines 4 were set to ±5V (rectangular pulse voltages) and −10V, respectively.

The "negative voltage" applied to the first conductive member represented by the gate signal lines 4 means a voltage (e.g., −10V) lower than the lowest voltage (herein, −5V) among the voltages (rectangular pulse voltages of ±5V) applied to the source signal lines 5 during the period when the TFT 9 is in the OFF state. In this case, in the period when the TFT 9 is in the ON state, a voltage of +10V is applied to the gate signal lines 4.

In the present specification, the terms "high" and "low" are used to describe the relationship between two voltages and these terms mean that an absolute voltage is high or low. For example, +5V is higher than ±0V, ±0V is higher than −5V, and −5V is higher than −10V.

In the case of the conventional liquid crystal screen display having no overcoat film aperture, unevenness was found in the portions repaired by laser irradiation after continuous driving in the same condition.

In contrast with the conventional fabrication method, the present embodiment does not require an additional process. More specifically, in the step of exposing the connector terminal, which is used for connection between the signal lines and the external driving circuit, from the overcoat film 12, the apertures 13 may be formed at the same time. The liquid crystal screen display of the present embodiment capable of restraining occurrence of display unevenness can be attained only by changing the configuration of the mask used in the step of processing the overcoat film 12 in the conventional fabrication process.

Figure 4:
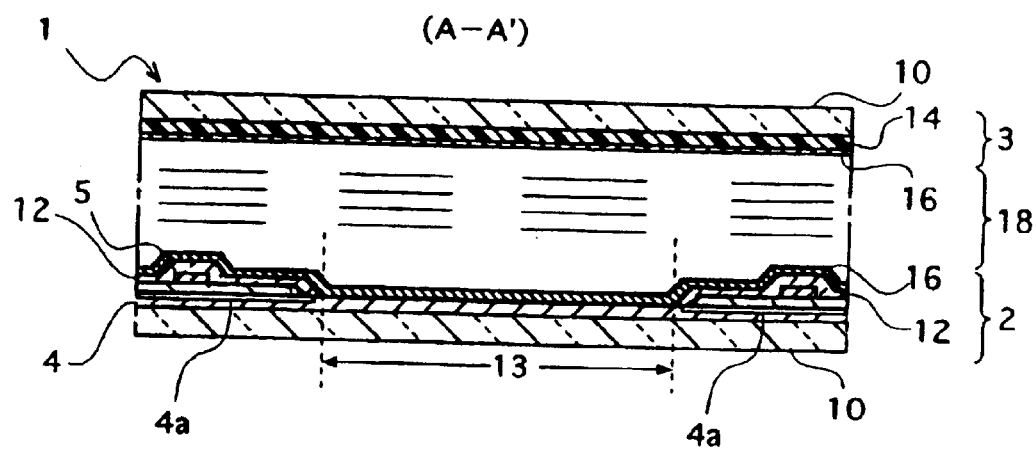
FIG. 4 is a longitudinal sectional view showing an essential part of a liquid crystal screen display according to another embodiment of the present invention.

The insulation of the elements with respect to one another can be enhanced by formation of an insulating film by anodic oxidation on the surfaces of the signal lines in the regions including the crossing parts of the signal lines and the gate electrode of the TFT 9, so that occurrence of electrical short between them can be effectively restricted. For instance, after formation of the gate signal lines 4 containing aluminum, an anodic oxidation film 4a is formed from aluminum oxide on the surfaces of the gate signal lines 4 in specified regions as shown in FIG. 4, by anodic oxidation by use of a mask which has a pattern for covering the regions of the apertures 13 and the connector terminal for connection between the signal lines and the external driving circuit.

Second Embodiment

While the first embodiment has been presented in terms of gate signal lines used as a member for ion generation, the second embodiment is associated with another form.

Figure 5:
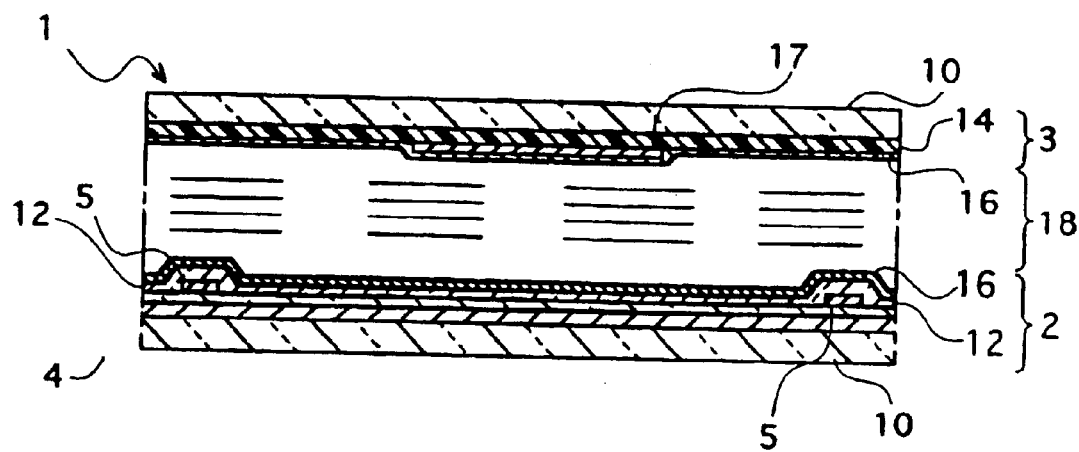
FIG. 5 is a longitudinal sectional view showing an essential part of a liquid crystal screen display according to still another embodiment of the present invention.

A third electrode, which is formed in contact with the alignment layer independently of the pixel electrodes and the common electrodes, is provided for the conventional liquid crystal screen display as a conductive member for ion generation, whereby a liquid crystal screen display capable of restraining occurrence of display unevenness due to uneven ion distribution can be obtained, similarly to the first embodiment. The liquid crystal screen display according to the second embodiment comprises the array substrate 2 having a structure similar to that of the conventional liquid crystal screen display shown in FIG. 17 and the opposed substrate 3 which includes a third electrode 17 having a negative potential with respect to the electrodes 6 and 7, as shown in FIG. 5.

The third electrode 17 is in contact with the alignment layer 16 and its potential is set equal to the OFF potential (i.e., the potential of the gate signal lines 4 when the TFT 9 connected to it is in the OFF state). For instance, the potential of the pixel electrodes 6 is reversed at ±5V with respect to the common electrodes 7 when the panel is in service and the common electrodes 7 are grounded (0V). While the panel is driven, the third electrode 17 is maintained at −10V and minus ions are constantly generated.

The third electrode is placed in a region opposed to a gate signal line of the opposed substrate, or alternatively placed in such a region on the array substrate or on the opposed substrate that the placement of the third electrode does not significantly affect display quality. Examples of such a region are the regions where a storage capacitor is disposed and where a source signal line is placed. Preferably, the third electrode is overlapped with the black matrix 14 on the opposed substrate 3. The black matrix 14 made from a conductive material such as chrome may be used as the third electrode.

Third Embodiment

If ions are continuously generated like the foregoing embodiments, the resistivity of the liquid crystal layer gradually decreases, restraining display unevenness, while there is the possibility of deterioration in display quality due to a constant decline in voltage retention during long use. Although it is possible to compensate for such changes by use of drive signals, the third embodiment will be described in terms of one example of liquid crystal screen displays capable of fundamentally preventing deterioration in display quality without compensation by use of such drive signals.

Figure 6:
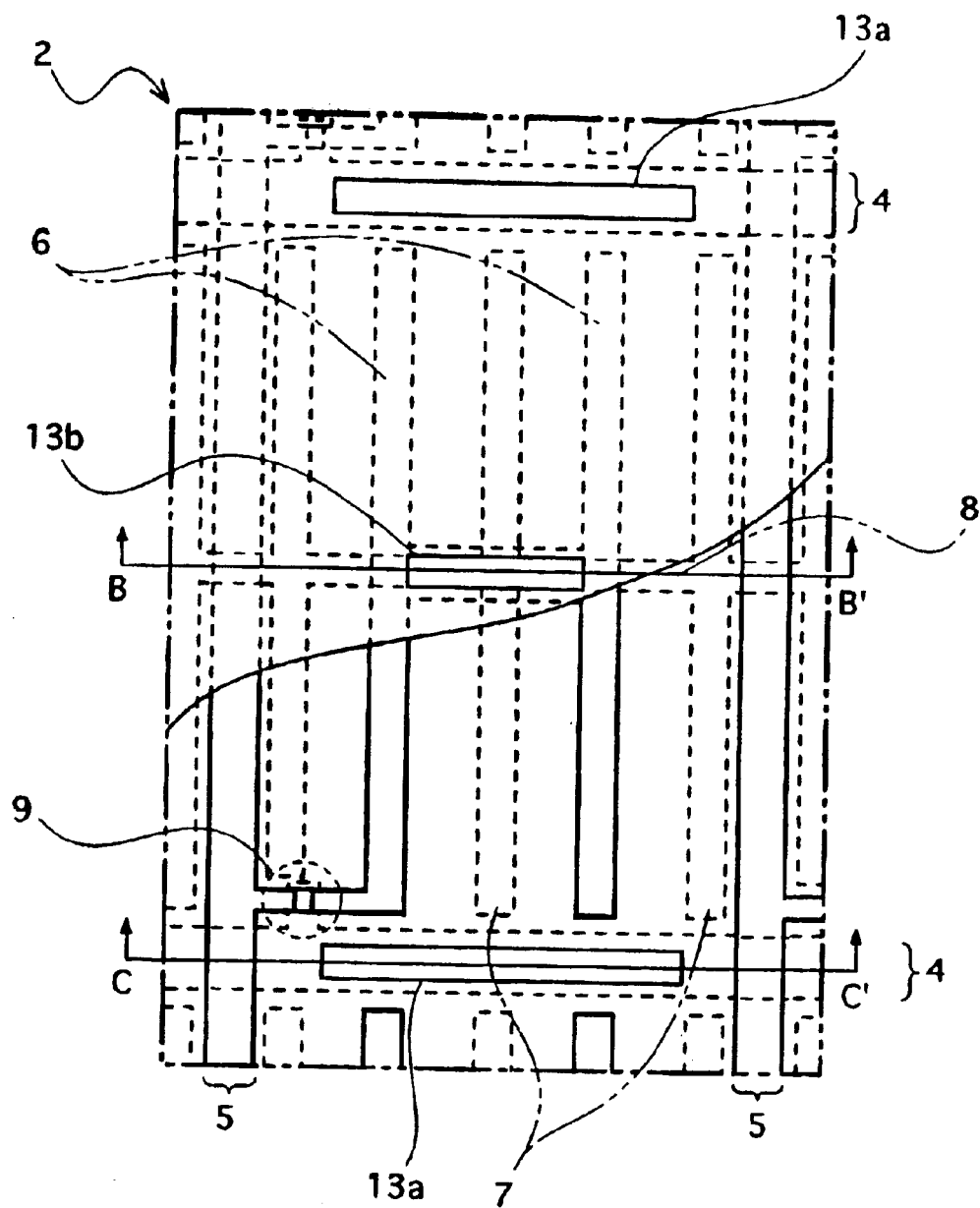
FIG. 6 is a partially cut-away plan view showing an essential part of an array substrate for use in a liquid crystal screen display according to still another embodiment of the present invention.
Figures 7A, 7B:
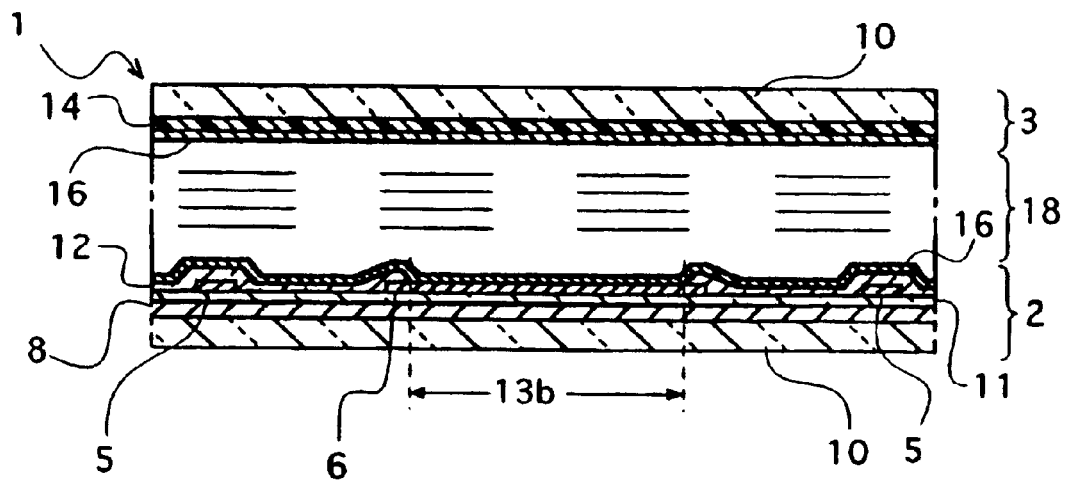
FIG. 7a is a sectional view taken along line B–B' of FIG. 6.
FIG. 7b is a sectional view taken along line C–C' of FIG. 6.

FIG. 6 shows an array substrate for use in the liquid crystal screen display of the third embodiment. FIGS. 7a and 7b show the liquid crystal screen display of the third embodiment.

The liquid crystal screen display of the third embodiment has apertures 13a for ion generation and an aperture 13b for ion retrieval. The apertures 13a are formed in parts of the gate signal lines by removing the overcoat film 12 therefrom like the first embodiment. The aperture 13b is formed in the region of the pixel electrodes 6 where the storage capacitor is formed. The apertures 13a and 13b are formed by processing the overcoat film 12 which has been formed beforehand, similarly to the formation of the apertures 13 in the foregoing embodiments.

For most of the driving period, the potential of the pixel electrodes 6 is higher than that of the gate signal lines 4. For example, when the voltage applied to the pixel electrodes 6 is ±5V (rectangular pulse voltage), the potential of the lowest pixel voltage is −5V, but the voltage applied to the gate signal lines 4 during the time the TFT 9 is in the OFF state is −10V. Therefore, the pixel electrodes 6 exposed to the liquid crystal layer 18 through the ion retrieval aperture 13b function to retrieve negative ions within the liquid crystal layer 18. Accordingly, ions are generated by the ion generation apertures 13a to make the ion distribution of the liquid crystal layer 18 uniform, whereas ions are retrieved by the ion retrieval aperture 13b thereby inhibiting an excessive rise in the ion concentration of the liquid crystal layer 18. In short, the liquid crystal screen display of the third embodiment includes a conductive member for ion generation as well as a conductive member for ion retrieval.

The liquid crystal screen display thus formed has proved successful in displaying satisfactory images free from display unevenness after continuous driving at 50° C. for 500 hours.

In the third embodiment, display unevenness can be eliminated by uniformly distributing ionized liquid crystal molecules within the liquid crystal layer 18 similarly to the first embodiment, whereas the electrons of the ionized (anionized) liquid crystal molecules are taken away by the second conductive member represented by the pixel electrodes 6 so that the ionized liquid crystal molecules become normal liquid crystal molecules. With this arrangement, the possibility of troubles in displaying can be lessened even if the number of ionized liquid crystal molecules increases too much within the liquid crystal layer 18, leading to excessively high ion concentration. In addition, the liquid crystal molecules, which have been anionized upon receipt of electrons at the ion generation apertures 13a from the first conductive member represented by the gate signal lines 4, are attracted by the pixel electrodes 6 at the ion retrieval aperture 13b, the pixel electrodes 6 having a potential higher than that of the gate signal lines 4. This electric attraction allows the ionized liquid crystal molecules within the liquid crystal layer to be quickly dispersed and uniformly distributed, compared to the first embodiment. This further reduces display unevenness.

Since the region where the ion retrieval aperture 13b is formed is covered with the black matrix 14 placed on the opposed substrate 3 as shown in FIG. 7a, the display quality of the panel is not affected by the provision of the ion retrieval aperture 13b. Additionally, since this region per se does not contribute to normal pixel displaying, it would give virtually no influence upon the display quality of the panel even if the liquid crystal screen display had no black matrix 14.

Fourth Embodiment

In the fourth embodiment, there will be explained an example in which an electrode similar to the third electrode of the second embodiment is used as the ion retrieval conductive member.

According to the fourth embodiment, there is provided a liquid crystal screen display incorporating an array substrate having ion generation apertures in an overcoat film immediately above gate signal lines like the first embodiment, and an opposed substrate having a third electrode similar to that of the second embodiment. wherein the potential of the third electrode is made to be positive relative to the potential of the gate signal lines. Effective ion retrieval can be performed by fixing the potential of the third electrode at a specified value or more preferably at the median value of source signals or a value proximate to the potential of the common electrodes.

Figure 8:
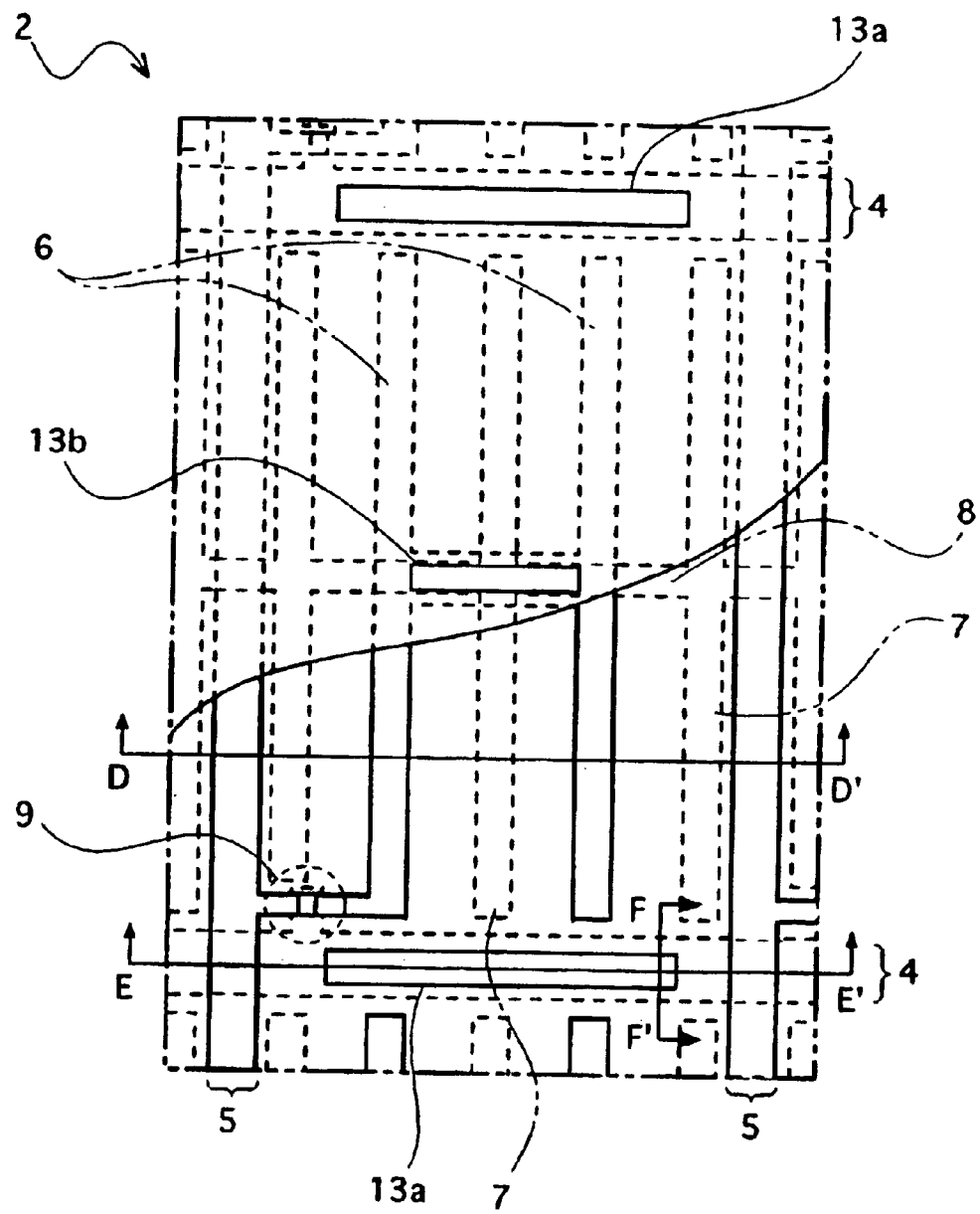
FIG. 8 is a partially cut-away plan view showing an essential part of an array substrate for use in a liquid crystal screen display according to still another embodiment of the present invention.
Figure 9A:
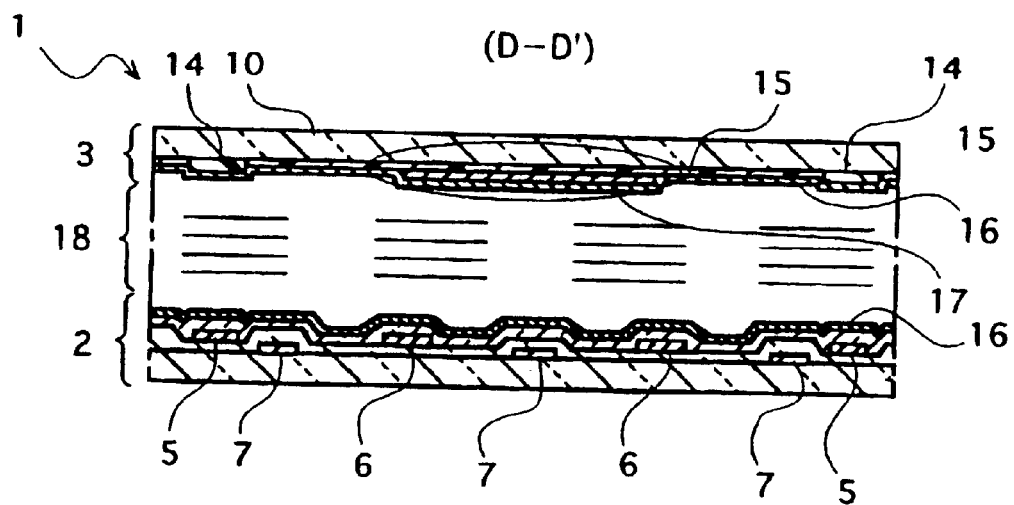
FIG. 9a is a sectional view taken along line D–D' of FIG. 8.
Figure 9B:
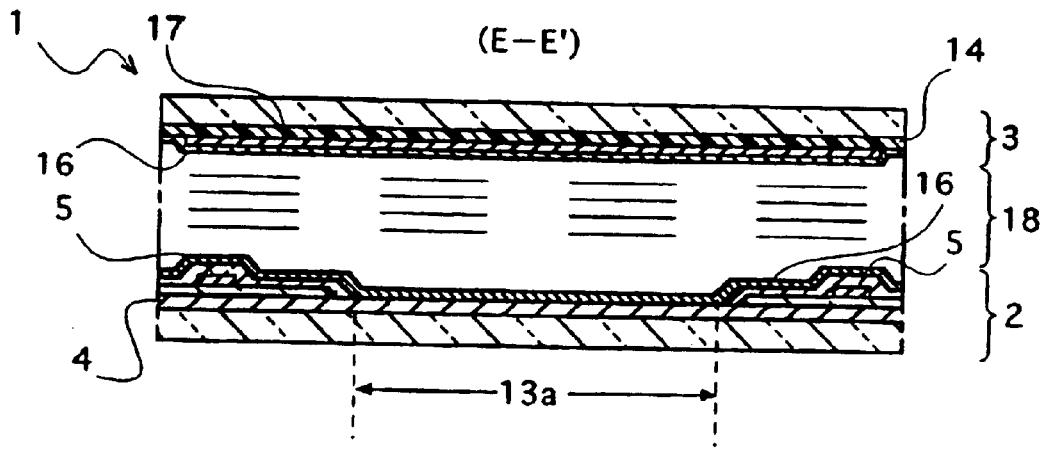
FIG. 9b is a sectional view taken along line E–E' of FIG. 8.
Figure 9C:
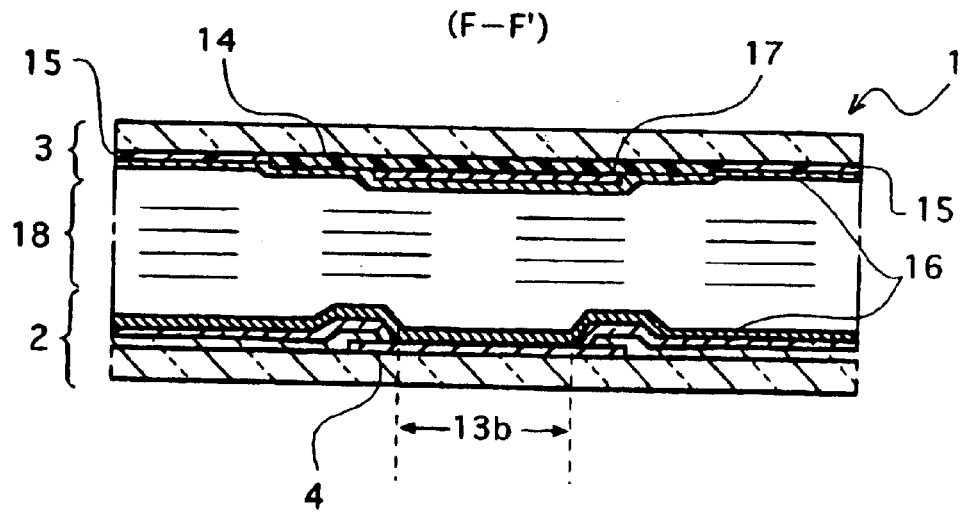
FIG. 9c is a sectional view taken along line F–F' of FIG. 8.

FIG. 8 shows an array substrate for use in another liquid crystal screen display according to the fourth embodiment. The array substrate 2 is similar to that of the third embodiment, including the ion generation apertures 13a in the regions where the gate signal lines 4 are disposed and the ion retrieval aperture 13b positioned immediately above the common electrode line 8. As shown in FIGS. 9a, 9b and 9c, the opposed substrate 3 used for the panel 1 has the third electrode 17 having a potential equal to the potential of the common electrodes. The third electrode 17 is positioned in contact with the liquid crystal layer 18 to retrieve ions.

This liquid crystal screen display has proved successful in displaying satisfactory images free from display unevenness after continuous driving at 50° C. for 1,000 hours.

Fifth Embodiment

The fifth embodiment will be explained in terms of one example in which an ion retrieval aperture is formed in a region of the overcoat film immediately above a common electrode.

Figure 10:
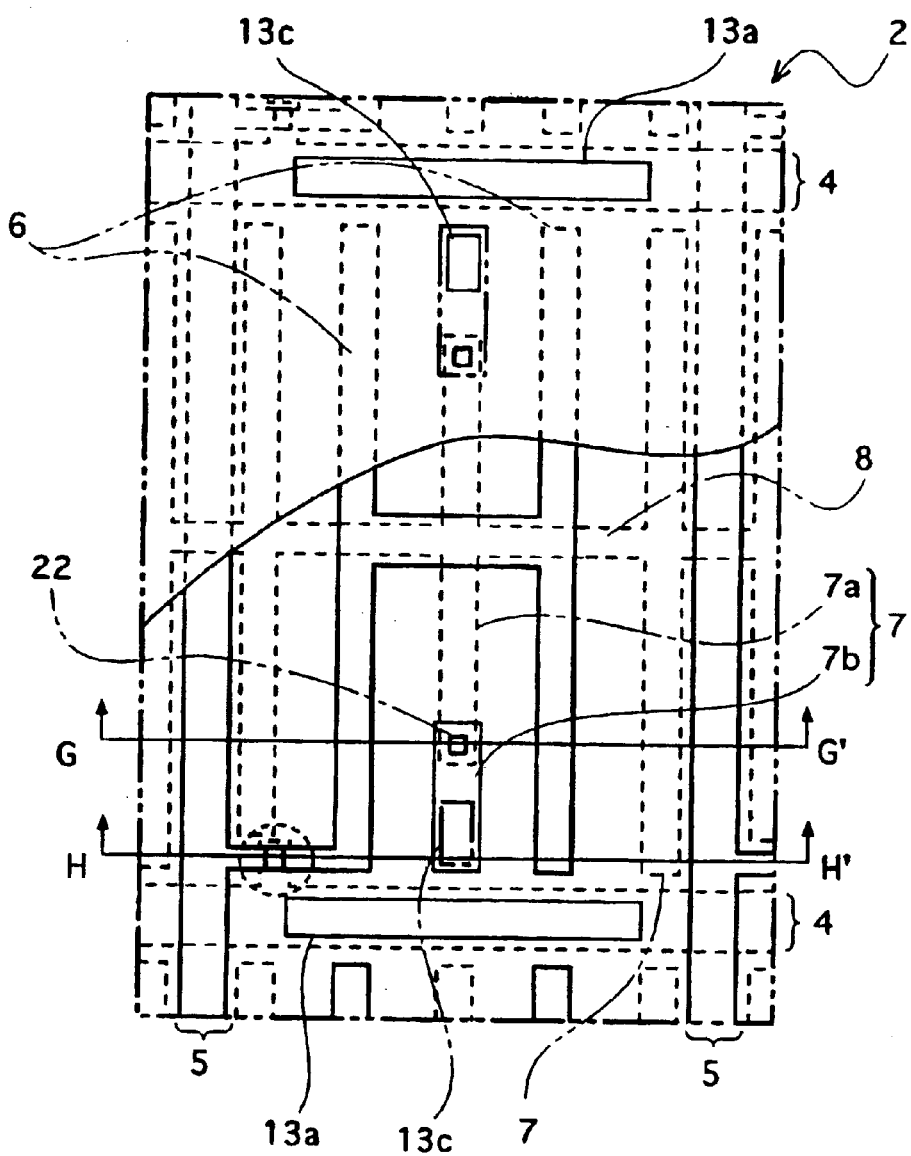
FIG. 10 is a partially cut-away plan view showing an essential part of an array substrate for use in a liquid crystal screen display according to still another embodiment of the present invention.
Figure 11A:
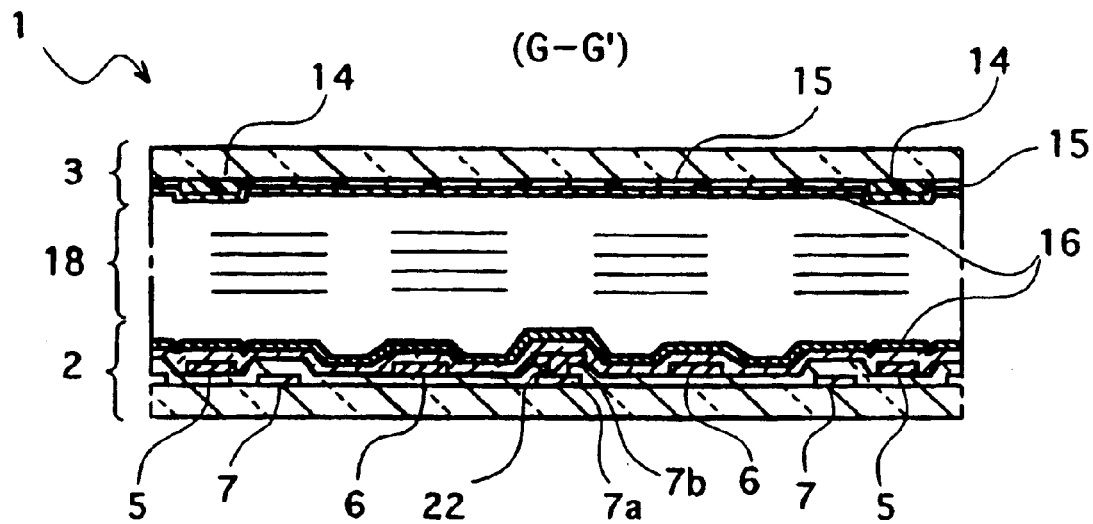
FIG. 11a is a sectional view taken along line G–G' of FIG. 10.
Figure 11B:
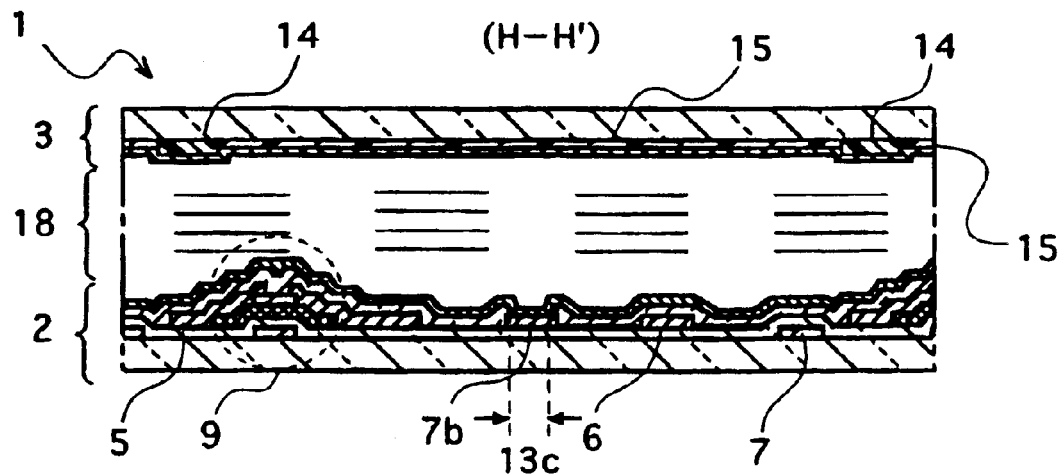
FIG. 11b is a sectional view taken along line H–H' of FIG. 10.

FIG. 10 shows an array substrate for use in the liquid crystal screen display of the fifth embodiment and FIGS. 11a and 11b show the liquid crystal screen display of the fifth embodiment.

A common electrode 7 is comprised of a first common electrode 7a and a second common electrode 7b, the first common electrode 7a being integrally formed with the gate signal lines 4, the common electrode line 8 and others while the second common electrode 7b is located in a layer upper than those elements with the insulating layer 11 between. The first common electrode 7a and the second common electrode 7b are electrically connected to each other through a contact hole 22 defined in the insulating layer 11.

The common electrodes 7 have a higher potential than the gate signal lines 4 for most of a driving period. By forming apertures 13c in the parts of the overcoat film 12 where a common electrode 7 is covered with the overcoat film 12, the ion retrieval function can be imparted to the parts of the gate signal lines 4 exposed through the apertures 13c.

For direct exposure of the common electrodes of the array substrate used in the liquid crystal screen displays of the first and other embodiments for instance, it is necessary to form an aperture which penetrates through the insulating layer and the overcoat film because the insulating layer and the overcoat film are located upper than the common electrodes. As the depth of the aperture increases, it becomes difficult to smoothly retrieve ions within the liquid crystal layer. In addition, the process for forming the hole that penetrates through a plurality of layers is troublesome.

In contrast with this, the fifth embodiment makes it possible to form the second common electrode 7b, which serves as a common electrode element having an aperture just above it, in a layer upper than the first common electrode 7a so as to be in contact with the overcoat film 12, so that the above-described obstacle to ion retrieval can be eliminated. In addition, electrical short between each first common electrode 7a and gate signal line 4 can be prevented in the process of integral formation of them. Even though each common electrode 7 is composed of two kinds of elements, that is, the first common electrode 7a and the second common electrode 7b, its function for establishing an electric field between the pixel electrodes 6 and it is not impaired.

The first common electrode 7a is formed through a process similar to the processes of the foregoing embodiments. The contact hole 22 is formed at the same time that the insulating layer 11 at the end of the substrate 10 is removed to expose the terminal used for connecting the gate signal lines 4 to the external circuit. The second common electrode 7b is formed simultaneously with the formation of the source signal lines 5, the pixel electrodes 6 and others. Accordingly, the liquid crystal screen display of the fifth embodiment can be accomplished without adding a new step to the fabrication process of the conventional liquid crystal screen display.

Figure 12:
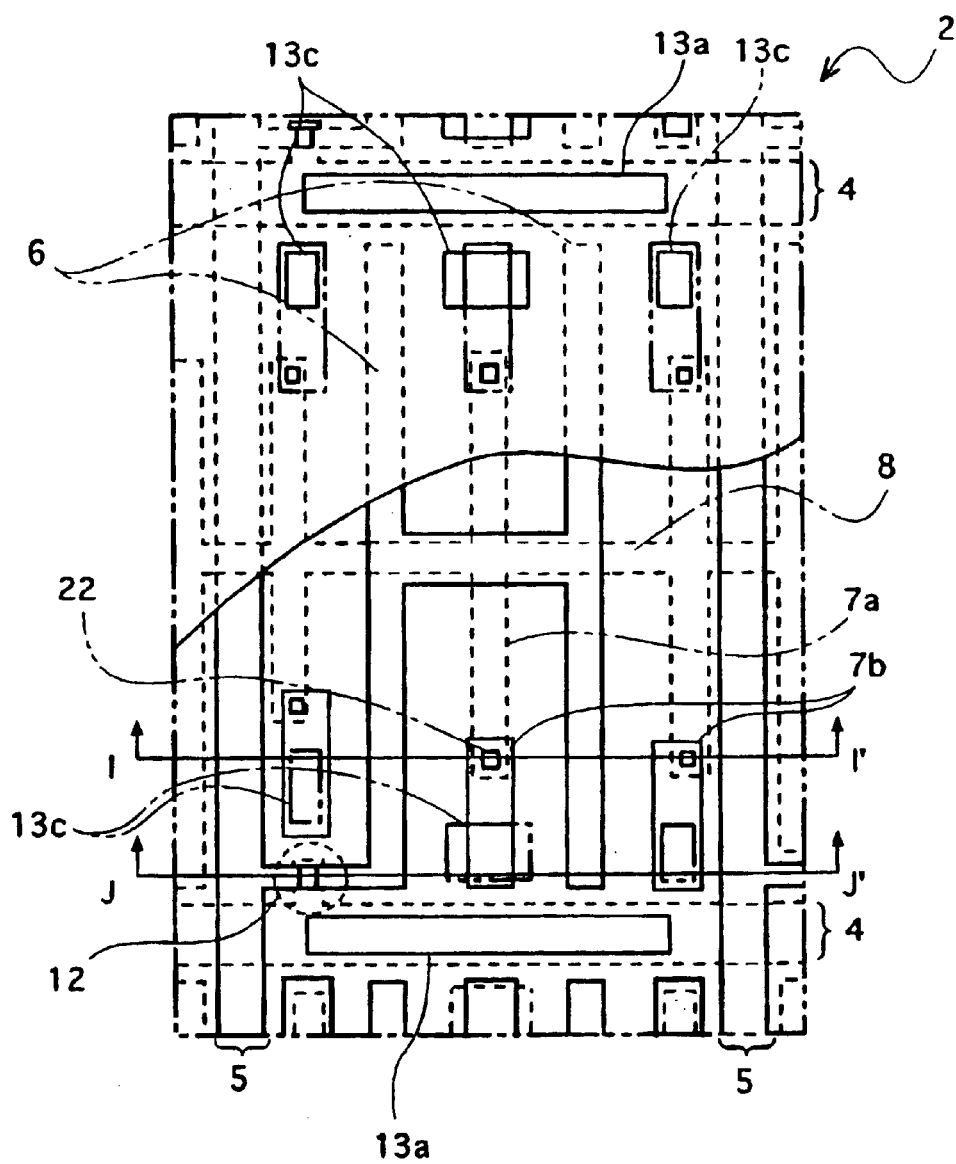
FIG. 12 is a partially cut-away plan view showing an essential part of an array substrate for use in a liquid crystal screen display according to still another embodiment of the present invention.
Figure 13A:
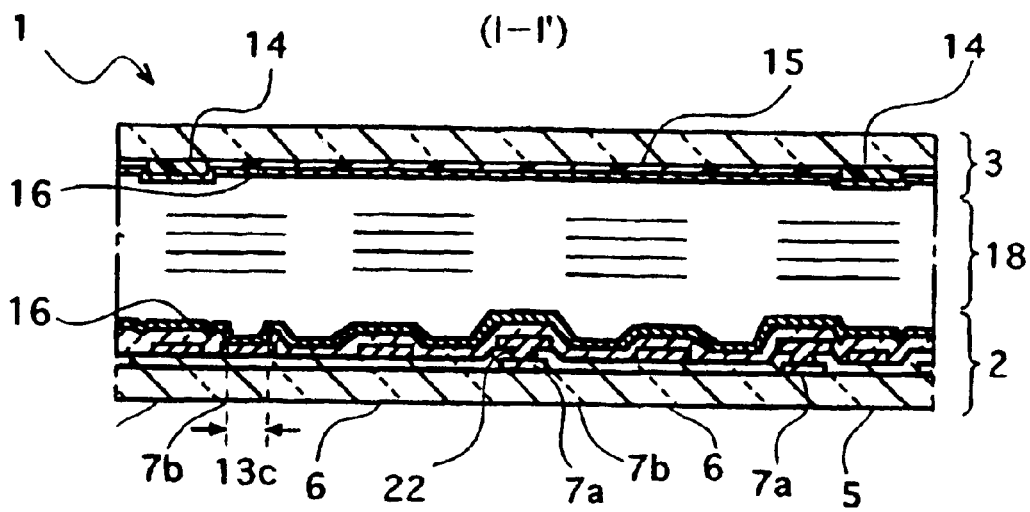
FIG. 13a is a sectional view taken along line I–I' of FIG. 12.
Figure 13B:
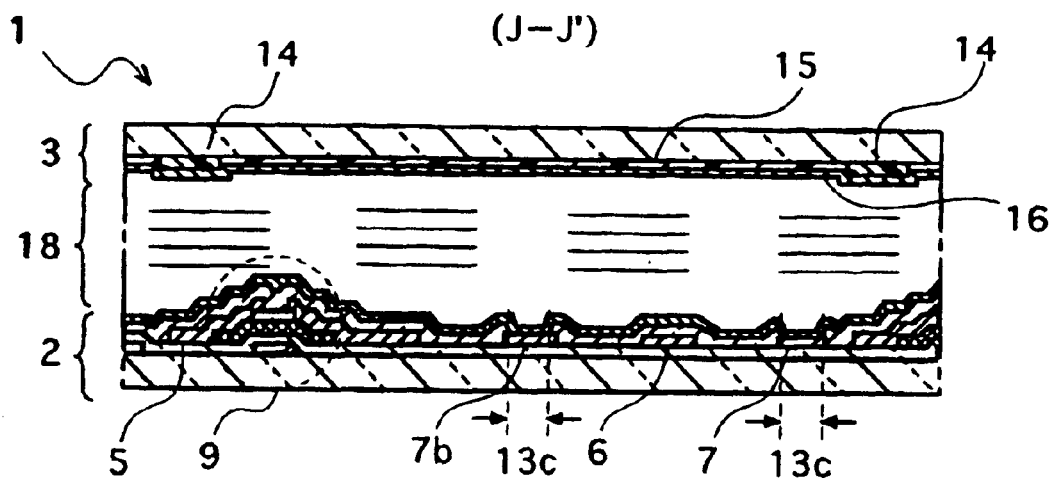
FIG. 13b is a sectional view taken along line J–J' of FIG. 12.

If all the common electrodes 7 are respectively formed from two kinds of elements, i.e., the first common electrode 7a and the second common electrode 7b as shown in FIGS. 12, 13a and 13b, electrical short between each first common electrode 7a and gate signal line 4 can be more reliably prevented in the process of integral formation of them and further, more effective ion retrieval is ensured when the display panel is in its driven state.

It is desired for more effective ion retrieval that the potential of the common electrodes be constant during driving of the panel.

Six Embodiment

The six embodiment will be explained in conjunction with another liquid crystal screen display capable of performing effective ion generation and ion retrieval.

Figure 14:
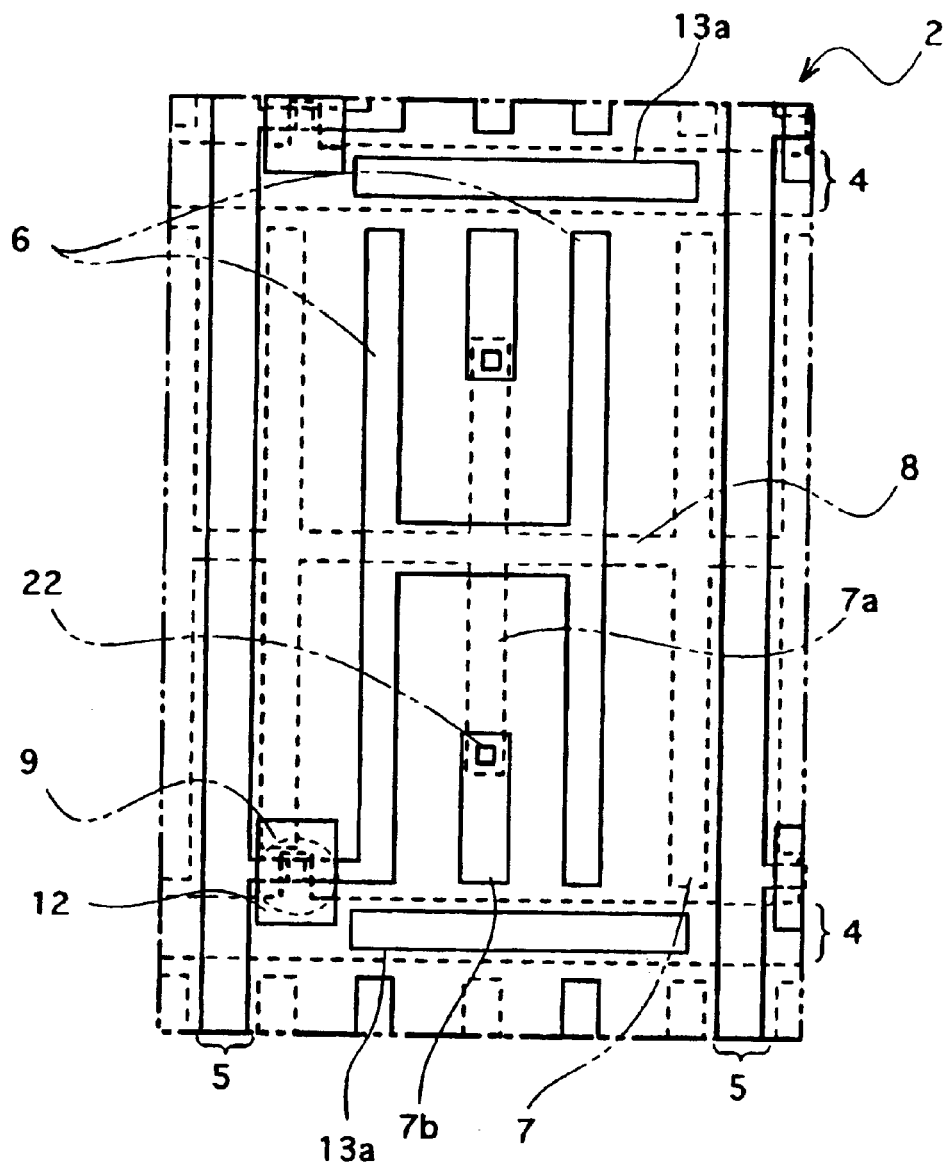
FIG. 14 is a partially cut-away plan view showing an essential part of an array substrate for use in a liquid crystal screen display according to still another embodiment of the present invention.

FIG. 14 shows an array substrate for use in the liquid crystal screen display of the six embodiment. The array substrate 2 has common electrodes one of which is composed of a plurality of elements placed on different layers like the fifth embodiment and the overcoat film 12 is formed on the TFT 9 and its peripheral region alone. Therefore, the source signal lines 5, the pixel electrodes 6 and the second common electrode 7b are exposed.

These exposed elements have the ion retrieval function. Accordingly, ions can be retrieved in a large area.

The array substrate of the six embodiment can be fabricated in the same way as the seventh embodiment except the processing pattern for the overcoat film 12.

The liquid crystal screen display of the sixth embodiment has proved successful in displaying satisfactory, unevenness-free images after continuous driving at 50° C. for 1000 hours.

The first to six embodiments have been presented on the condition that the ionized liquid crystal molecules within the liquid crystal layer 18 are anions. This is based on such findings attained by the present inventors after conducting many experiments that one of the causes of display unevenness occurring when images are displayed on the screen with the gate signal lines 4 exposed by laser irradiation is anionized liquid crystal molecules. Therefore, in a liquid crystal screen display having cationized liquid crystal molecules in the liquid crystal layer, the positive/negative and high/low relationships of voltage are all reversed. Accordingly, the voltage applied to the conductive member such as the gate signal lines or the pixel electrodes is not "a negative voltage" but "a positive voltage". Likewise, the voltage applied to the second conductive member is not "a positive voltage" but "a negative voltage".

Seventh Embodiment

The seventh embodiment will be described, taking a case for example in which ion generation and ion retrieval are more effectively carried out.

Figure 15:
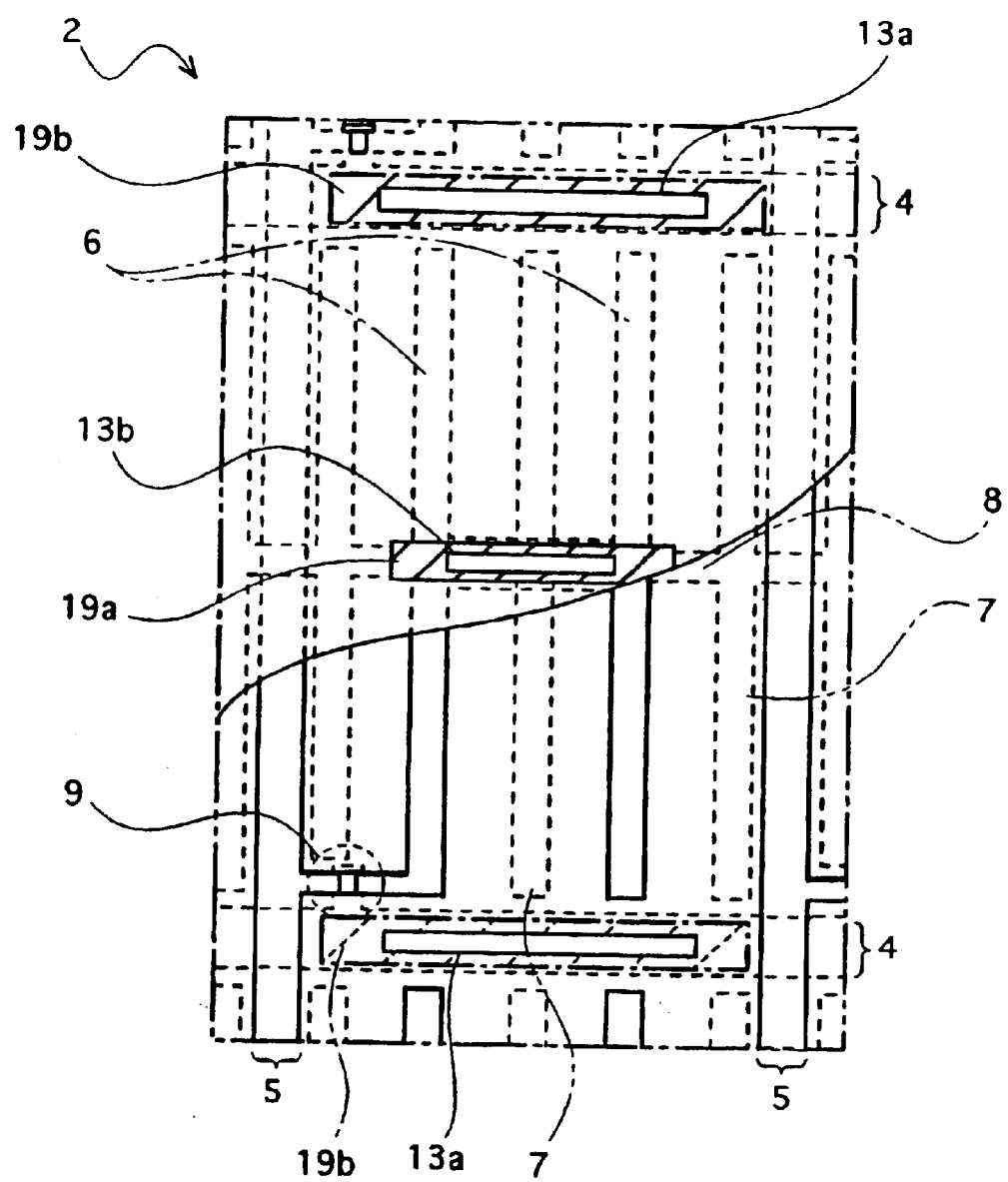
FIG. 15 is a partially cut-away plan view showing an essential part of an array substrate for use in a liquid crystal screen display according to still another embodiment of the present invention.

FIG. 15 shows an array substrate for use in the liquid crystal screen display of the seventh embodiment. The array display 2 has the overcoat film apertures 13a in the regions where the gate signals 4 are formed similarly to the third embodiment and the overcoat film aperture 13b immediately above the common electrode line 8. The array substrate 2 further comprises catalyst layers 19a, 19b that are adjacent to the apertures 13a, 13b and include fine titanium oxide particles as a catalyst. According to the liquid crystal screen display of the seventh embodiment, in the regions where the ion generation apertures 13a and the ion retrieval aperture 13b are defined by the catalyst layers 19a and 19b, activation energy caused by the reaction between ionized liquid crystal molecules and unionized liquid crystal molecules are lowered to speed up the electro-chemical reaction between them, whereby more effective ion generation and ion retrieval are carried out.

The catalyst layers 19a and 19b are formed in such a way that, for example, a paste of photo-curable resin prepolymer having fine catalyst particles dispersed therein is applied to the surface of the substrate 10 where the overcoat film 12 is formed and then, the coated film thus formed is processed into a desired shape. The catalyst layers 19a, 19b are cured and shrunk by heating so that clacks are created on their surfaces to increase their surface area, thereby obtaining more significant catalytic effects.

Examples of the catalyst for the catalyst layers include inorganic semiconductor catalysts such as tin oxide; precious metal catalysts such as platinum, palladium and rubidium; and organic semiconductor catalysts such as polyaniline and polythiophene. The catalyst layers prepared by fine particles carrying a catalyst have a large surface area and therefore exert significant catalytic effects. For effective ion generation and ion retrieval, the catalysts layers are preferably positioned in the vicinity of the conductive member for ion generation and the conductive member for ion retrieval.

Eighth Embodiment

The eighth embodiment will be described, taking a case for example in which an ion absorbable substance is used for ion retrieval.

Figure 16A:
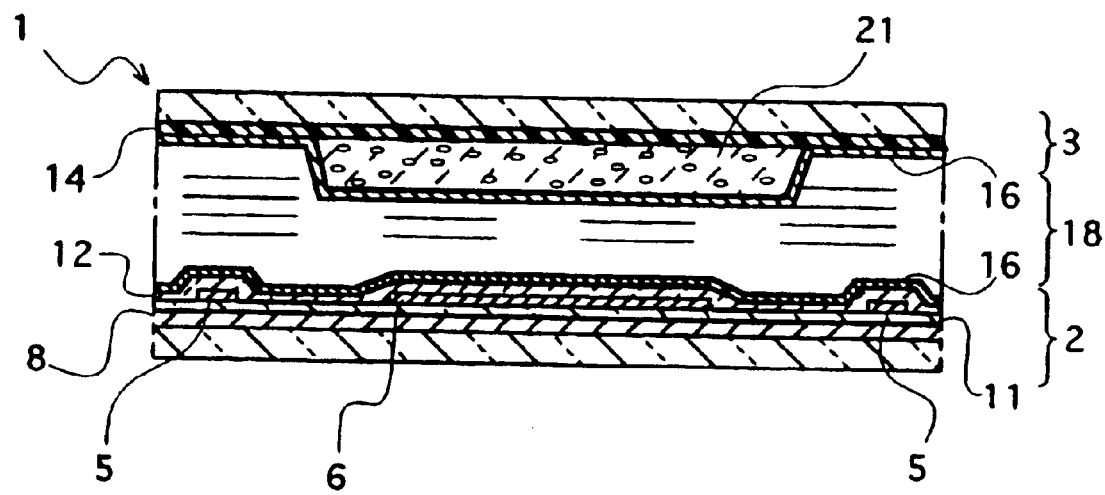
FIG. 16 is a longitudinal sectional view showing an essential part of a liquid crystal screen display according to still another embodiment of the present invention.
Figure 16B:
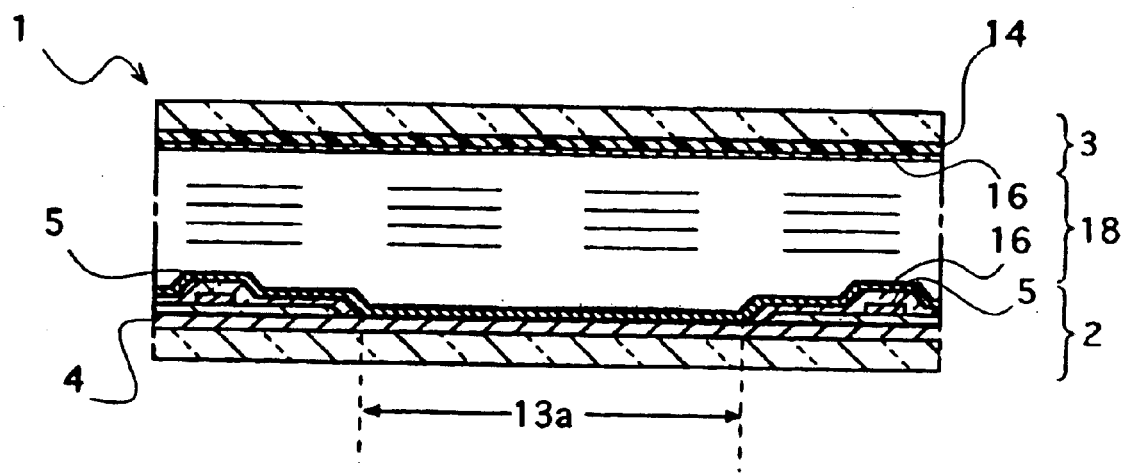

A paste prepared by dispersing fine particles of aluminum oxide carrying nickel as a catalyst in a photo-curable resin is applied to the black matrix 14, and the coated film thus formed is processed to form an ion absorbing layer 21 as shown in FIG. 16. The placement of the ion absorbable substance in contact with the liquid crystal layer obviates the need for processing the overcoat film etc. in order to form an ion retrieval element like the foregoing embodiments.

Ninth Embodiment

Display unevenness due to uneven ion distribution can be effectively restrained by dissolving an ionic substance, that is, electrolytic salt in the liquid crystal layer beforehand. Even if ions are generated by the potential of the gate signal lines and others within the liquid crystal layer, variations in ion concentration are insignificant so that occurrence of display unevenness can be suppressed. For instance, $(t\text{-}Bu)_4NX$ (X is halogen) such as represented by $(t\text{-}Bu)_4NCl$ and $(t\text{-}Bu)_4NBr$; $(t\text{-}Bu)_4NCOOR$ (R=H, a hydro carbon group such as $C_{2n}H_{2n+1}$, or alkali metal) or the like is added in an amount of 200 ppm to 1000 ppm.

INDUSTRIAL APPLICABILITY

According to the present invention, there are provided liquid crystal screen displays capable of restraining occurrence of display unevenness attributable to ions generated within the liquid crystal layer and displaying satisfactory images after driving for a long time. Therefore, the invention highly contributes to improvements in the performance and reliability of liquid crystal displays.

What is claimed is:

1. A liquid crystal screen display comprising:
   a first insulating substrate;
   a second insulating substrate facing the first insulating substrate;
   a liquid crystal layer formed between the first and second insulating substrates;
   alignment layers formed between the first insulating substrate and the liquid crystal layer and between the second insulating substrate and the liquid crystal layer, respectively, for aligning the liquid crystal layer; and
   a first conductive member which is formed on the first insulating substrate and interposed between the first insulating substrate and its corresponding alignment layer, being in partial contact with the alignment layer and to which a negative voltage is applied, the first conductive member being gate signal lines.

2. The liquid crystal screen display according to claim 1, wherein regions accounting for 10 to 50% of the first conductive member are in contact with the alignment layer.

3. The liquid crystal screen display according to claim 1, wherein an oxidation layer is formed in the regions of the gate signal lines where the gate signal lines respectively intersect source signal lines.

4. The liquid crystal screen display according to claim 1, wherein pixel electrodes and counter electrodes for applying a voltage to a liquid crystal of the liquid crystal layer are formed on the first insulating substrate.

5. The liquid crystal screen display according to claim 1, further comprising a light blocking layer formed on the first or second insulating substrate,
   wherein the first conductive member is formed so as to overlap with the light blocking layer in a plan view of the display.

6. The liquid crystal screen display according to claim 1, further comprising a second conductive member which is disposed between at least either one of the first and second insulating substrates and its corresponding alignment layer, being in partial contact with the alignment layer, and to which a voltage higher than the negative voltage applied to the first conductive member is applied.

7. The liquid crystal screen display according to claim 6, wherein the second conductive member is formed on the first insulating substrate.

8. The liquid crystal screen display according to claim 7, further comprising:
   a switching element formed on the first insulating substrate, the switching element having a source electrode connected to the source signal lines, a gate electrode connected to the gate signal lines and a drain electrode connected to pixel electrodes; and
   counter electrodes formed on the first insulating substrate for applying a voltage to a liquid crystal of the liquid crystal layer between the counter electrodes and the pixel electrodes;
   wherein the second conductive member is the pixel electrodes.

9. The liquid crystal screen display according to claim 7, further comprising:
   a switching element formed on the first insulating substrate, the switching element having a source electrode connected to the source signal lines, a gate electrode connected to the gate signal lines and a drain electrode connected to pixel electrodes; and
   counter electrodes formed on the first insulating substrate for applying a voltage to a liquid crystal of the liquid crystal layer between the counter electrodes and the pixel electrodes;
   wherein the second conductive member is the counter electrodes.

10. The liquid crystal screen display according to claim 7, further comprising:
    a switching element formed on the first insulating substrate, the switching element having a source electrode connected to the source signal lines, a gate electrode connected to the gate signal lines and a drain electrode connected to pixel electrodes; and
    counter electrodes formed on the first insulating substrate for applying a voltage to a liquid crystal of the liquid crystal layer between the counter electrodes and the pixel electrodes;
    wherein the second conductive member is the pixel electrodes and the counter electrodes.

11. The liquid crystal screen display according to claim 6, wherein the second conductive member is formed on the second insulating substrate.

12. The liquid crystal screen display according to claim 11, further comprising:
    a switching element formed on the first insulating substrate, the switching element having a source electrode connected to the source signal lines, a gate electrode connected to the gate signal lines and a drain electrode connected to pixel electrodes; and
    counter electrodes formed on the first insulating substrate for applying a voltage to a liquid crystal of the liquid crystal layer between the counter electrodes and the pixel electrodes.

13. The liquid crystal screen display according to claim 11, further comprising:
    a switching element formed on the first insulating substrate, the switching element having a source electrode connected to the source signal lines, a gate electrode connected to the gate signal lines and a drain electrode connected to pixel electrodes; and
    counter electrodes formed on the second insulating substrate for applying a voltage to a liquid crystal of the liquid crystal layer between the counter electrodes and the pixel electrodes;
    wherein the second conductive member is the counter electrodes.

14. The liquid crystal screen display according to claim 6, further comprising a light blocking layer formed on the first or second insulating substrate, wherein the second conductive member is formed so as to overlap with the light blocking layer in a plan view of the display.

15. The liquid crystal screen display according to claim 1, further comprising a catalyst placed in the vicinity of the first conductive member in contact with its corresponding alignment layer, for reducing activation energy caused by the reaction between unionized liquid crystal molecules and ionized liquid crystal molecules.

16. The liquid crystal screen display according to claim 15, wherein the catalyst includes a metal oxide.

17. The liquid crystal screen display according to claim 15, wherein the catalyst includes a precious metal.

18. The liquid crystal screen display according to claim 15, wherein the catalyst includes an organic semiconductor compound.

19. The liquid crystal screen display according to claim 1, further comprising an ion absorber provided for the second insulating substrate.

20. The liquid crystal screen display according to claim 19, further comprising:
- a switching element formed on the first insulating substrate, the switching element having a source electrode connected to the source signal lines, a gate electrode connected to the gate signal lines and a drain electrode connected to pixel electrodes; and
- counter electrodes formed on the first insulating substrate for applying a voltage to a liquid crystal of the liquid crystal layer between the counter electrodes and the pixel electrodes.

* * * * *